US008264490B2

(12) United States Patent
Debevec et al.

(10) Patent No.: US 8,264,490 B2
(45) Date of Patent: Sep. 11, 2012

(54) PRACTICAL MODELING AND ACQUISITION OF LAYERED FACIAL REFLECTANCE

(75) Inventors: Paul E. Debevec, Marina del Rey, CA (US); Abhijeet Ghosh, Playa del Rey, CA (US)

(73) Assignee: University of Southern California, Los Angeles, CA (US)

( * ) Notice: Subject to any disclaimer, the term of this patent is extended or adjusted under 35 U.S.C. 154(b) by 741 days.

(21) Appl. No.: 12/364,370

(22) Filed: Feb. 2, 2009

(65) Prior Publication Data

US 2009/0226049 A1     Sep. 10, 2009

Related U.S. Application Data

(60) Provisional application No. 61/025,178, filed on Jan. 31, 2008.

(51) Int. Cl.
*G06T 15/00* (2011.01)

(52) U.S. Cl. ........ 345/473; 345/426; 345/419; 345/619; 382/118

(58) Field of Classification Search .................. 345/419, 345/619, 473, 474, 475, 426; 382/118
See application file for complete search history.

(56) References Cited

U.S. PATENT DOCUMENTS

| | | | |
|---|---|---|---|
| 6,919,962 | B2 | 7/2005 | Debevec et al. |
| 7,152,024 | B2 | 12/2006 | Marschner et al. |
| 7,436,403 | B2 | 10/2008 | Debevec et al. |
| 7,609,860 | B2 * | 10/2009 | Lee et al. ..................... 382/118 |
| 2006/0280343 | A1 | 12/2006 | Lee et al. |
| 2008/0304081 | A1 | 12/2008 | Debevec et al. |

FOREIGN PATENT DOCUMENTS

WO    WO 2005/124660 A2    12/2005

OTHER PUBLICATIONS

Debevec, P. et al. Acquiring the Reflectance Field of a Human Face. SIGGRAPH: Proceedings of the 27th annual conference on Computer graphics and interactive techniques, 2000, pp. 145-156, Retrieved from the Internet: http://dx.doi.org/10.1145/344779.344855.
International Search Report for PCT Application Serial No. PCT/US09/32879, mailed on Apr. 8, 2009.
Ma, W.C. et al. Rapid Acquisition of Specular and Diffuse Normal Maps from Polarized Spherical Gradient Illumination. Eurographics Symposium on Rendering (2007), Retrieved from the Internet: http://web.archive.org/web/20071126011657/http://www.ict.usc.edu/publications/EGSR2007_SGI_high.pdf.

\* cited by examiner

*Primary Examiner* — Phu K Nguyen (74) *Attorney, Agent, or Firm* — McDermott Will & Emery LLP (57) ABSTRACT

Techniques are described for modeling layered facial reflectance consisting of specular reflectance, single scattering, and shallow and deep subsurface scattering. Parameters of appropriate reflectance models can be estimated for each of these layers, e.g., from just 20 photographs recorded in a few seconds from a single view-point. Spatially-varying specular reflectance and single-scattering parameters can be extracted from polarization-difference images under spherical and point source illumination. Direct-indirect separation can be employed to decompose the remaining multiple scattering observed under cross-polarization into shallow and deep scattering components to model the light transport through multiple layers of skin. Appropriate diffusion models can be matched to the extracted shallow and deep scattering components for different regions on the face. The techniques were validated by comparing renderings of subjects to reference photographs recorded from novel viewpoints and under novel illumination conditions. Related geometry acquisition systems and software products are also described.

36 Claims, 6 Drawing Sheets

Modeled skin reflectance components.

Figure 2: Modeled skin reflectance components.

(a) Dot pattern  (b) Full illumination  (c) Zero-crossings (d) Scattering profiles within dots  (e) Fitted deep scattering

FIG. 8

PRACTICAL MODELING AND ACQUISITION OF LAYERED FACIAL REFLECTANCE

RELATED APPLICATION

This application claims the benefit of U.S. Provisional Patent Application No. 61/025,178, entitled "Practical Acquisition and Modeling of Layer Facial Reflectance," filed 31 Jan. 2008, the entire contents of which are incorporated herein by reference.

STATEMENT REGARDING FEDERALLY FUNDED RESEARCH

This invention was made with government support under Contract No. W911NF-04-D0005 awarded by the Army Research Office. The government has certain rights in the invention.

BACKGROUND

Realistically reproducing the appearance of the human face from novel viewpoints and under novel complex illumination remains a challenging problem in computer graphics due the complexity of human facial reflectance and a person's keen eye for its subtleties. The appearance of the face under given lighting conditions is the result of complex light interactions with a complex, inhomogeneous material. Realistic facial reflectance requires a model consisting of spatially-varying specular and diffuse reflectance which reproduces the effects of light scattering through multiple layers of translucent tissue.

Advances in the field of 3D scanning and reflectance measurement have enabled significant strides in the rendering of realistic faces. However, while existing methods for accurately modeling the appearance of human skin are able to achieve impressive results, it is not clear how to practically acquire the necessary parameters for these models to accurately reproduce the facial appearance of live subjects. Existing prior art acquisition techniques are either very data intensive, or they extrapolate parameters from a small exemplar skin patch to cover the whole face, or they make simplifications to the skin reflectance model.

Modeling Skin with BRDFs

In an effort to model skin appearance, some prior art techniques have utilized bi-directional reflectance distribution functions ("BRDFs"). For example, Marschner et al. [1999] use an image-based technique to obtain the aggregate BRDF of a human forehead from photographs taken under multiple lighting directions. Marschner at al. [2009] create facial renderings by modulating the diffuse component of such a BRDF with the diffuse albedo map estimated from multiple cross-polarized photographs of the face. Georghiades et al. [1999] built models of facial shape and reflectance from a small number of unknown point-source lighting directions using an enhanced version of photometric stereo [Woodham 1978]. These works assume a Lambertian reflection model, and ignore specular reflection. To account for specular reflections, Georghiades extend [Georghiades et al. 1999] to estimate a single Torrance-Sparrow specular lobe across the entire face. How-ever, they note that the lack of spatially-varying specular behavior limits the technique's ability to model the observed data, which limits the realism of the renderings. Reflectance Sharing [Zickler et al. 2006] trades spatial resolution for angular reflectance information to estimate spatially-varying BRDFs from a small number of photographs of a face. All of these methods model skin reflectance solely using BRDF models, omitting the subsurface scattering behavior of skin.

Modeling Subsurface Scattering

Modeling subsurface scattering behavior is important to create the soft, semi-translucent appearance of skin. Without subsurface scattering, renderings of skin look too harsh. Hanrahan and Krueger [1993] use a Monte-Carlo simulation to develop local reflectance models for the single and multiple scattering components of human skin and other layered tissues. Jensen et al. [2001] introduced a practical dipole model to simulate scattering behavior, and show how to infer parameters from the observation of the spread of a small white beam of light incident on a patch of skin. Donner and Jensen [2005] extend the dipole model to simulate transmission through and reflection from multiple layers, yielding a more accurate skin rendering model. More recently, Donner and Jensen [2006] presented an easily parameterized, spectrally-accurate version of the multi-layer model. These works mostly focus on practically modeling subsurface scattering for rendering. However, they do not deal with obtaining spatially-varying parameters for the dipole model or the multi-layer models. Specialized techniques, such as [Goesele et al. 2004; Tong et al. 2005; Peers et al. 2006; Wang et al. 2008], can acquire and model a wide variety of subsurface scattering materials, including skin, but are limited to planar samples only, or have acquisition times that are impractically long for human subjects.

Realistic Face Scanning

Debevec et al. [2000] use a dense sphere of incident lighting directions to record specular and sub-surface reflectance functions of a face at relatively high angular resolution. However, the model is data-intensive in both acquisition and storage. Additionally, inclusion in existing rendering systems requires significant effort. Fuchs et al. [2005] use a smaller number of photographs and lighting directions, at the cost of sacrificing continuously-varying specular reflectance. Tariq et al. [2006] use a set of approximately forty phase-shifted video projector lines to estimate per-pixel scattering parameters for faces. However, their acquisition times were as long as a minute, and they did not model the specular reflectance of skin. Weyrich et al. [2006] use a dense sphere of lighting directions and sixteen cameras to model the per-pixel specular BRDF and diffuse albedo of faces. In addition, they use a custom subsurface scattering measurement probe to obtain scattering parameters for skin. While the obtained appearance model yields impressive results, it still requires a minute to complete a full capture consisting of thousands of images.

What is desired therefore are techniques for modeling and acquisition of reflectance that address the shortcomings noted previously for the prior art.

SUMMARY

The present disclosure provides techniques (including systems, methods, software products) that address the limitations noted for the prior art. The detail in the facial appearance model can be such that full-screen close-ups can be faithfully reproduced. The techniques can utilize modeling facial skin reflectance as a combination of the effects of light reflection from the different layers of the skin: specular reflectance, single scattering, and shallow and deep multiple scattering. Mathematical models can be tailored and used for each of the layered facial reflectance components. Parameters of appropriate reflectance models can be estimated for each of these layers. Such techniques can provide practical appearance models that are easy to incorporate in existing rendering systems, and can facilitate working with live subjects by providing relatively fast acquisition thus avoiding registration problems, temporal changes in the appearance (e.g., due to sweat or blood flow), and enabling capture of facial appearance of natural expressions, which can be difficult to hold for more than a few seconds.

An aspect of the present disclosure is directed to methods for modeling layered facial reflectance consisting of specular reflectance, single scattering, and shallow and deep subsurface scattering. Parameters of appropriate reflectance models can be estimated for each of these layers, e.g., from just 20 photographs recorded in a few seconds from a single viewpoint. Spatially-varying specular reflectance and single-scattering parameters can be extracted from polarization-difference images under spherical and point source illumination. Next, direct-indirect separation can be employed to decompose the remaining multiple scattering observed under cross-polarization into shallow and deep scattering components to model the light transport through multiple layers of skin. Finally, appropriate diffusion models can be matched to the extracted shallow and deep scattering components for different regions on the face.

A further aspect of the present disclosure is directed to image capture systems for rendering a facial image. Such image capture systems can include a plurality of light sources having light output intensities that are controllable so as to generate one or more spherical gradient illumination patterns. A plurality of polarizing filters (polarizers) can also be included that are configured and arranged adjacent to the plurality of light sources so as to polarize light from the light sources in a desired orientation; wherein the plurality of light sources and the plurality of polarizing filters are arranged to illuminate the surface of a person's face with one or more polarized spherical gradient illumination patterns. The system can include two (or more) cameras configured to receive light that is reflected from the illuminated person's face, and to generate from the reflected light photographic data of the person's face. The cameras have a desired polarization. A light projector can also be included that is configured and arranged to illuminate the location for the person's face with a desired light projection. A processing system (e.g., a computer with a suitable CPU and/or CPU and memory) can be included that is configured and arranged to receive specular reflectance and diffuse reflectance data from the cameras, and to calculate reflectance for the facial image based on a layered facial reflectance model.

Moreover, embodiments of the present disclosure can be implemented in computer-readable medium (e.g., hardware, software, firmware, or any combinations of such), and can be distributed over one or more networks. Steps and operations described herein, including processing functions to derive, learn, or calculate formula and/or mathematical models utilized and/or produced by the embodiments of the present disclosure can be processed by one or more suitable processors, e.g., central processing units ("CPUs") and/or one or more graphics processing units ("GPUs") implementing suitable code/instructions.

While aspects of the present disclosure are described herein in connection with certain embodiments, it is noted that variations can be made by one with skill in the applicable arts within the spirit of the present disclosure and the scope of the appended claims.

BRIEF DESCRIPTION OF THE DRAWINGS

Aspects and embodiments of the present disclosure may be more fully understood from the following description when read together with the accompanying drawings, which are to be regarded as illustrative in nature, and not as limiting. The drawings are not necessarily to scale, emphasis instead being placed on the principles of the disclosure. In the drawings.

While certain embodiments are depicted in the drawings, one skilled in the art will appreciate that the embodiments depicted are illustrative and that variations of those shown, as well as other embodiments described herein, may be envisioned and practiced within the scope of the present disclosure.

DETAILED DESCRIPTION

The present disclosure, in general terms, provides techniques for modeling facial skin reflectance as a combination of different layers: specular reflectance, single scattering, and shallow and deep multiple scattering. Modeling can be performed for layered facial reflectance components consisting of specular reflectance, single scattering, and shallow and deep subsurface scattering. Parameters of appropriate reflectance models can be estimated for each of these layers, e.g., from just 20 photographs recorded in a few seconds from a single viewpoint. Spatially-varying specular reflectance and single-scattering parameters can be extracted from polarization-difference images under spherical and point source illumination. For these techniques, direct-indirect separation can be employed to decompose the remaining multiple scattering observed under cross-polarization into shallow and deep scattering components to model the light transport through multiple layers of skin. Finally, appropriate diffusion models can be matched to the extracted shallow and deep scattering components for different regions on the face. As a result, an estimation can be made of spatially-varying specular reflectance parameters, and this can be augmented with high fidelity normal estimates and also include single scattering and sub-surface scattering models.

Figure 1A:
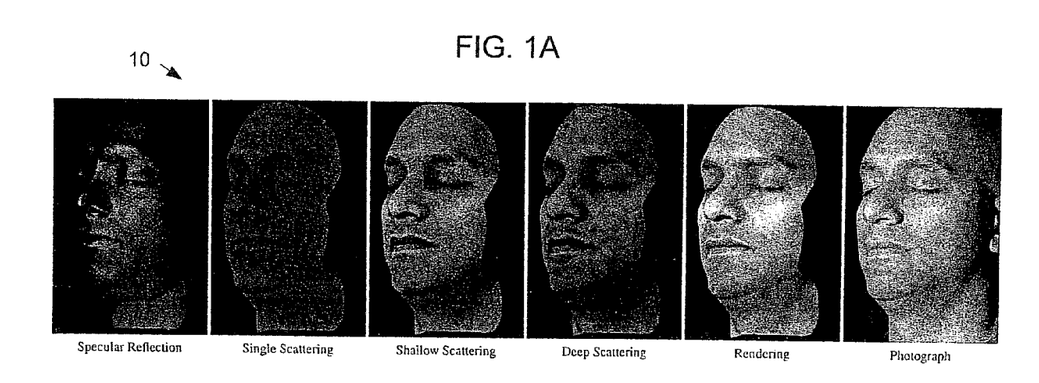
FIG. 1 depicts different layers of skin reflectance as modeled by an exemplary embodiments of the present disclosure.

FIG. 1A depicts a collection 10 of images showing an individual's skin reflectance modeled as a combination of difference layers: (a) specular reflectance; (b) single scattering; (c) shallow scattering; and (d) deep scattering; also shown are (e) a rendering (a synthesized image) of the individual's face, and (f) a photograph for ease of comparison.

In FIG. 1A, the layers of facial reflectance that compose renderings are shown in accordance with an exemplary embodiment of the present disclosure. The image second from the right shows an offline rendering of the face under novel illumination and viewpoint that is the composition of the layers modulated by the corresponding transmittance terms. At the right is a validation photograph from the side which was not used for reflectance modeling. Despite the significant change in viewpoint and relative lighting direction, the rendering shown can be seen to closely resemble the photograph, including the spatially-varying specular and subsurface reflectance.

Because the setup used to obtain the images in FIG. 1 utilized a single camera for reflectance modeling, some texture stretching can be observed at the sides of the nose. Without correction, the lips and parts of the eyelids will appear darker in the diffuse albedo than in the reference photograph, because the albedo is computed from images under full-on spherical illumination which includes partial occlusion from the lips and nose respectively. A correction of the estimate of the diffuse albedo can be made using an inverse simulation.

For each layer, e.g., as shown in FIG. 1A, a suitable reflectance or scattering model is selected, and parameters are obtained using a single high-resolution still camera to capture a small set of 20 photographs under environmental and projected lighting conditions. For each reflectance component, estimates or inferences are made of high-frequency details such as albedo and normals per pixel based on the environmental illumination patterns, while modeling lower-frequency BRDF and scattering behavior per region based on the projected patterns. This allows for fast acquisition and straightforward processing, while achieving a high level of realism in the resulting models. Although prior art research has captured and modeled some of these individual components, no existing system has acquired and modeled all of these reflectance components together of a live subject. The effectiveness of exemplary embodiments has been demonstrated with both qualitative visual comparisons as well as quantitative validation of extracted model parameters against those available in the literature.

Embodiments of the present disclosure can minimize/reduce the number of photographs (and thus acquisition time) from which multi-layer scattering parameters can be estimated. Embodiments can estimate a more expressive facial reflectance model from a relatively small set of photographs, e.g., approximately 20 photographs captured from a single viewpoint. As a result, embodiments/method can be less data intensive, can be implemented in high resolution at a relatively low cost, and can avoid the task of building reflectance datasets from images from multiple viewpoints.

Reflectance Data and Geometry Acquisition

A geometry acquisition system/process can be employed to obtain the facial geometry of a subject. A measurement setup, calibration process, and 3D scanning system can be used for such embodiments. A geometry acquisition system can be used that separates from reflected light the components due to specular reflection and diffuse reflection. As the Fresnel equations imply that the polarization state of specularly reflected light is determined by the polarization state of the incident light, diffuse and specular components of reflected light can be effectively separated by controlling the polarization state of incident light while also measuring the polarization state of the reflected light.

For such geometry acquisition and setup, as described in further detail below, surface normal maps of an object (e.g., a face) can be estimated from either its diffuse or specular reflectance using spherical gradient illumination patterns. The spherical illumination patterns allow the normals to be estimated simultaneously from any number of viewpoints. Polarized lighting techniques can be utilized that allow the diffuse and specular normal maps of an object to be measured independently, e.g., for image rendering and structured light 3D scanning.

Setup

EXEMPLARY EMBODIMENTS

In exemplary embodiments a lighting setup can consist of an LED sphere with a desired number of lights, e.g., approximately 150 individually controllable lights. Each light can be covered with a linear polarizer in exemplary embodiments. For example, a light source array can be configured to create a spherical direction field of linear polarization for the lights so that the light reflected specularly reflected toward the camera view point will be vertically polarized regardless of the angle of incidence, in other words regardless of which light it originated from. The pattern can be created by individually tuning linear polarizers placed over each light source on the sphere to minimize the observed specular reflection from a spherical test object as viewed through the camera's linear polarizer.

Such illumination patterns can also be found through numerical optimization, e.g., as shown and described in Applicant's co-owned U.S. patent application Ser. No. 12/105,141, entitled "Acquisition of Surface Normal Maps from Spherical Gradient Illumination" filed 17 Apr. 2008, the entire contents of which are incorporated herein by reference; and as also described in Ma et al., "Rapid Acquisition of specular and Diffuse Normal Maps form Polarized Spherical Gradient Illumination," University of Southern California, (2007), the entire contents of which are incorporated herein by reference.

Figure 1B:
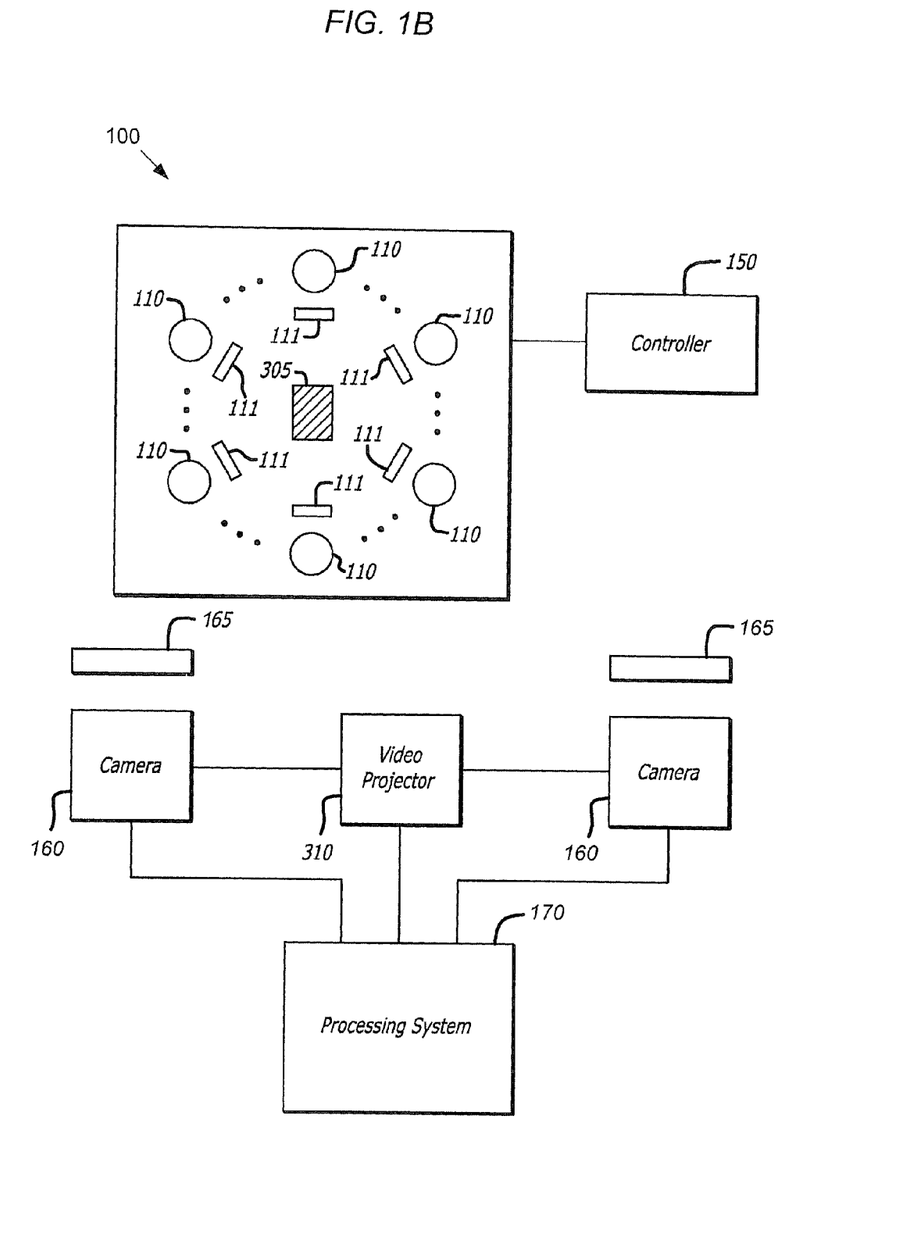

FIG. 1B depicts a schematic block diagram of a structured light scanning system 100 in accordance with exemplary embodiments of the present disclosure. System 100 can use high-resolution specular normal maps to generate a high resolution scan of a surface of an object 105.

The system 100 includes a plurality of light sources, each labeled in FIG. 1 with reference numeral 110; an optical imaging system such as a camera 160; a controller 150; and a processing system 170. The plurality of light sources 110 may be LEDs (light emitting diodes) for example, or any other light sources known in the art. As one of many possible examples, the light sources 110 may include reflected light from a screen illuminated by a video projector. As another of many possible examples, the light sources 110 may include light from the pixels of a computer monitor.

The light sources 110 can have intensities that are controllable so as to generate one or more gradient illumination patterns. In this disclosure, the term "gradient illumination pattern" can refer to an illumination pattern generated by a plurality of light sources the intensities of which are varied so as to form a ramp or gradient from a low intensity to a high intensity. The light sources 110 can be configured and arranged to illuminate the surface of the object 105 with the gradient illumination patterns, which in the illustrated embodiment are spherical gradient illumination patterns. In other words, the gradient illumination patterns generated by the light sources are substantially spherical in their angular extend surrounding the object.

The light sources 110 may be arranged in many different configurations. As just one example, the light sources may be arranged in a substantially spherical configuration around the object, so that the object is lit from each direction as determined by the location of each light source on the spherical configuration. Different configurations of the light sources may be used in different embodiments of the present disclosure.

In one of many possible embodiments, the plurality of light sources 110 may be shaped as a once-subdivided icosahedron that surrounds the object and that has a diameter of about a couple meters. A light source 110 may be placed on each edge and vertex of the icosahedron, yielding 156 light sources an average of 18.degree. apart. Each light source may be built from three Luxeon V white LEDs (Light Emitting Diodes), which together may produce 360 lumens. Each light source may be focused toward the subject using a Fraen wide beam tri-lens optic, yielding 420 lux at 1 meter distance.

With continued reference to FIG. 1B, the controller 150 individually controls the intensities of the light sources 110 so as to generate the gradient illumination patterns, and drives the plurality of light sources 110 so as to illuminate the surface of the object 105 with the gradient illumination patterns.

The optical imaging system, e.g., including pair of cameras 160, is configured to receive light reflected from the illuminated surface of the object 105, and to generate data representative of the reflected light. Such data may include data representative of the specular reflectance of the surface of the object, or data representative of the diffuse reflectance of the surface of the object, or a combination of both. Such data may also include data representative of the subsurface reflectance of the object. Descriptions of specular reflectance, diffuse reflectance, and surface normal maps may be found for example in published U.S. Patent Application No. 2005/0276441 (entitled "Performance Relighting and Reflectance Transformation with Time-multiplexed Illumination"), owned by the assignee of the present disclosure, as well as in published U.S. Patent Application No. 2004/0227948 (entitled "Reflectometry Apparatus and Method") also owned by the assignee of the present disclosure; both of which applications are incorporated herein by reference in their entireties.

In an exemplary embodiment in which a specular normal map and a diffuse normal map of a surface of an object are generated separately and independently, the system 100 may further include a set of polarizers 111 for the light sources, and a camera polarizer 165, i.e. a polarizer for the camera 160. As further described below, the set of polarizers 111 are adapted to be placed over the light sources 110 so as to polarize light from the light sources 100, so that the light sources (each having a polarizer 111 placed over it) illuminate the surface of the object 105 with one or more polarized spherical gradient illumination patterns. The camera polarizer 165 polarizes the reflected light in a way that specularly reflected light is separated from diffusely reflected light, before the reflected light is received by camera, as further described below. In this embodiment, the processing system 170 is configured to generate specular reflectance data representative of the specularly reflected light and diffuse reflectance data representative of the diffusely reflected light, and to separately estimate a specular normal map from the specular reflectance data and a diffuse normal map from the diffuse reflectance data.

The polarizers 111 may either be linear polarizers, or circular polarizers, the use of both of which is further described below. For linearly polarized illumination, for example, a linear polarizer may be mounted on a servomotor in front of the camera, allowing the polarizer to be rapidly flipped on its diagonal between horizontal and vertical orientations. For circular polarization, a circular polarizer placed in front of the camera may be manually flipped or switched, e.g., by a mechanical actuator. For some applications/embodiments, the polarizers 111 may be individually tunable polarizers.

In exemplary embodiments, the set of polarizers 111 may be linear polarizers oriented so as to polarize the light from the light sources so that after reflection of the light by the object toward the camera, the specularly reflected light is polarized in a consistent direction. Each camera polarizer 165 may be a linear polarizer that is oriented in such a way as to attenuate polarized specular light reflected by the object; horizontal polarizers may be used as well. In addition to light sources 110, polarizers 111, camera(s) 160, and camera polarizers 365, the descriptions of which have been provided above, the scanning system 100 can include a video projector 310 configured to project one or more structured light patterns onto the illuminated surface of the object.

In an exemplary embodiment, the system 100 included a vertically polarized LCD video projector 310 is aimed towards the center of the sphere. A stereo pair of radiometrically calibrated 10-Megapixel Canon ID Mark III digital SLR cameras 160 were placed on opposite sides of the projector 310. The right camera was used only for geometry measurement and was horizontally polarized while the left camera was switched between horizontal and vertical polarization through a mechanical actuator (not shown).

Calibration

The purpose of using polarized illumination is to tune out specular reflections on the subject. For this, the linear polarizers can be aligned on the sphere such that specular highlights are invisible through a horizontally polarized camera. This can be easily achieved by placing a dielectric spherical reflector (i.e., plastic ball) in the middle of the LED sphere, and rotating each polarizer until no highlight is visible through the left camera.

A challenge for reflectance measurement can be presented by the two different illumination sources in exemplary embodiments: the LCD projector, and the white LEDs. To compensate for the differences in emitted spectra, the responses of 24 ColorChecker squares and 10 corresponding skin patches can be measured on different subjects. Using SVD, a 3×3 color matrix can be computed that transforms the observed photographs to a common illuminant color space. In one embodiment, the skin colors did not match well when using only the ColorChecker samples; including the skin samples was found to provide a much closer match between the different color spaces. A similar color calibration can be performed for additional illuminants used to generate the reference images in the results in this paper. In addition, a reference black level photograph of the subject can be subtracted from every recorded photograph under projected illumination to compensate for the black level illumination from the projector.

Geometry Acquisition

Accurate 3D geometry of a subject is required to faithfully model the subject's skin reflectance. The methods of Ma et al. [2007] can be used in exemplary embodiments to obtain geometry from stereo correspondence and specular normals. For this, four projected color fringe patterns can be captured for 3D stereo reconstruction, and eight photographs of the subject under four different gradient illumination conditions and two polarization directions. However, alternative methods that can measure detailed facial geometry with accurate surface normals could also be used for this purpose.

In addition to these twelve photographs, eight more photographs are recorded to infer the appropriate reflectance and scattering models, in exemplary embodiments. The eight photographs can include the following: a black level reference for the video projector (1 image); a cross-polarized grid of black dots projected from the front to measure subsurface scattering parameters (1 image); a pair of cross-polarized and parallel-polarized front-lit (i.e., full-on projector pattern) images to model specular and diffuse reflectance (2 images); and, four phase-shifted stripe patterns to separate shallow and deep scattering (4 images).

Recording these 20 photographs can be a short-duration process, e.g., takes just 5 seconds with an exemplary current setup, with the major limiting factor being the frame rate of the digital SLR cameras. Using faster high resolution cameras could reduce acquisition times to under a second.

Skin Reflectance Model

Exemplary Embodiments

Figure 2:
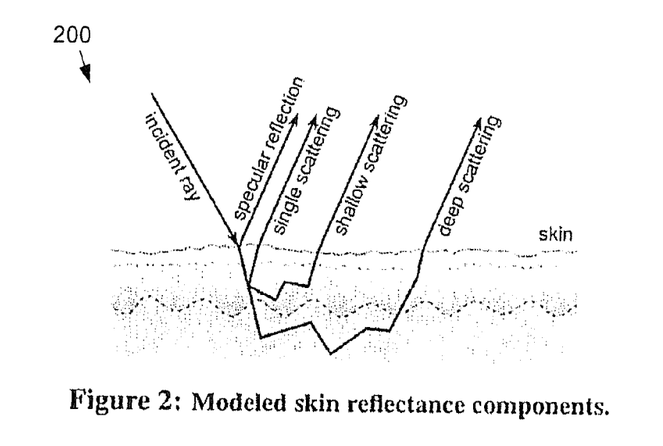
FIG. 2 depicts a cross sectional view of a skin layer model illustrating reflection and scattering from an incident ray, in accordance with an exemplary embodiment of the present disclosure.

FIG. 2 depicts a view of a skin layer model 200 illustrating reflection and scattering from an incident ray, in accordance with an exemplary embodiment of the present disclosure.

As shown in FIG. 2, skin reflectance can be modeled as a combination of four phenomena: specular reflection, single scattering, shallow multiple scattering, and deep multiple scattering. Illumination conditions can be designed to measure each of these components as directly and in-dependently as possible. Image-based measurements can be fit to different reflectance models, each of which is chosen according to the type of phenomena being modeled. Later renderings can be created by summing the contributions of these four components, modulating the light received by the scattering components by appropriate transmittance terms. In order to model these reflectance effects from a limited set of photographs, some aspects of reflectance can be modeled per pixel (e.g., albedos and surface normals), some aspects per region (e.g., specular roughness and scattering parameters), and some aspects for the entire face (e.g., the angular dependence of the scattering components).

Further descriptions, below, are provided for the specular and single scattering model. Polarization can be used to isolate these phenomena from multiple subsurface scattering, and detail which data is required to fit appropriate reflectance models. The multiple subsurface scattering can be further separated into deep, and shallow scattering.

Specular Reflection and Single Scattering

The polarization properties of skin to can be leveraged extract specular reflectance and single scattering. Both phenomena generally maintain the polarization of light. Multiple scattering phenomena, on the other hand, generally depolarizes light. It is therefore preferable that data is acquired under polarized spherical and front-lit illumination, and record parallel- and cross-polarized images of each lighting condition. The cross-polarized images only include depolarized reflected light (i.e., due to multiple scattering events), whereas the parallel-polarized images contain both polarized as well as depolarized reflected light. Computing the difference between the corresponding parallel-polarized and cross-polarized images yields an image exhibiting only polarized reflected light, i.e., specular reflected and some non-specular reflected light which maintains polarization. The latter component is dominated by single scattering, because the probability of de-polarization of light increases exponentially with each additional scattering event. Any observed polarization preserving non-specular reflection can be treated, therefore, as the result of single scattering events, e.g., as shown in FIG. 3.

Figure 3:
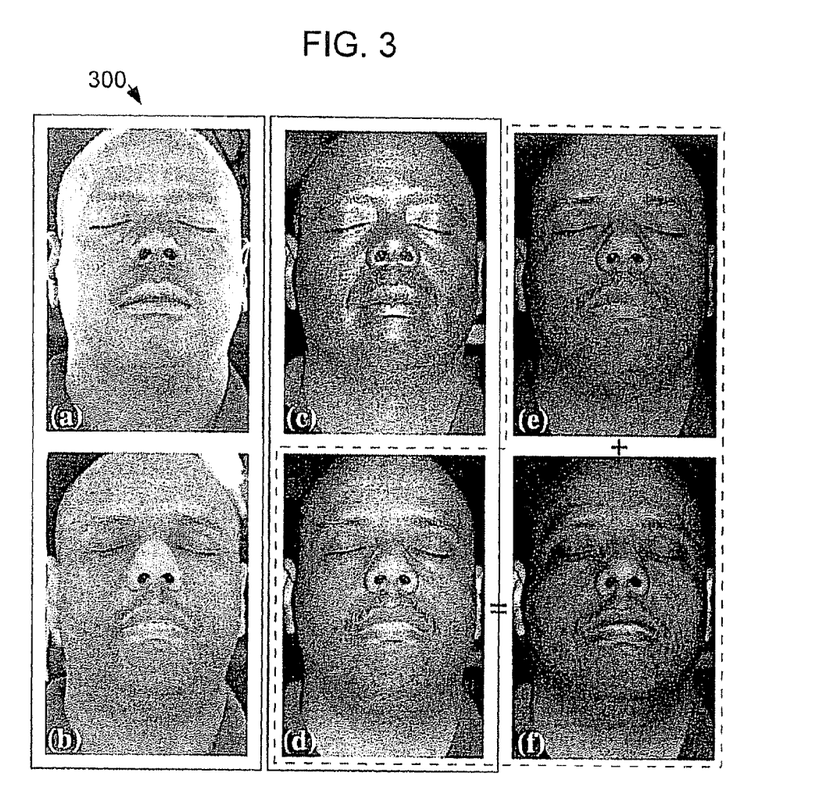
FIG. 3 includes six photographs depicting different measured reflectance values and components of a test subject, in accordance with an exemplary embodiment of the present disclosure.

FIG. 3 depicts a collection 300 of six photographs depicting different measured reflectance values and components of a test subject, in accordance with an exemplary embodiment of the present disclosure.

FIG. 3 illustrates the separation and contribution of measured reflectance components of an exemplary embodiment: (a) a polarization difference image under spherical illumination, used for estimating specular albedo; (b) a cross-polarized image under spherical illumination, used to measure total scattered albedo; (c) a polarization difference image under directional illumination, used for estimating the specular lobe shape per region—the image also includes some polarization preserving non-specular backscattering (which can be modeled as mostly single-scattering), which can be seen to pick up color from the melanin in the epidermis; (d) a cross-polarized image under directional illumination, showing multiple scattering; (e) a "direct" component of (d), showing shallow scattering; and (f) an "indirect" component of (d), showing deeply scattered light. It can be noted that as indicated FIG. $3(d)=3(e)+3(f)$ and that $3(c)+3(d)$ produces a typical front-lit photograph.

The polarization-difference images in FIGS. 3 (a) and (c) show specular reflections and single scattering on a face under spherical and directional illumination respectively. FIGS. 3 (b) and (d) show the effects of multiple scattered illumination under the same lighting conditions.

Figure 4:
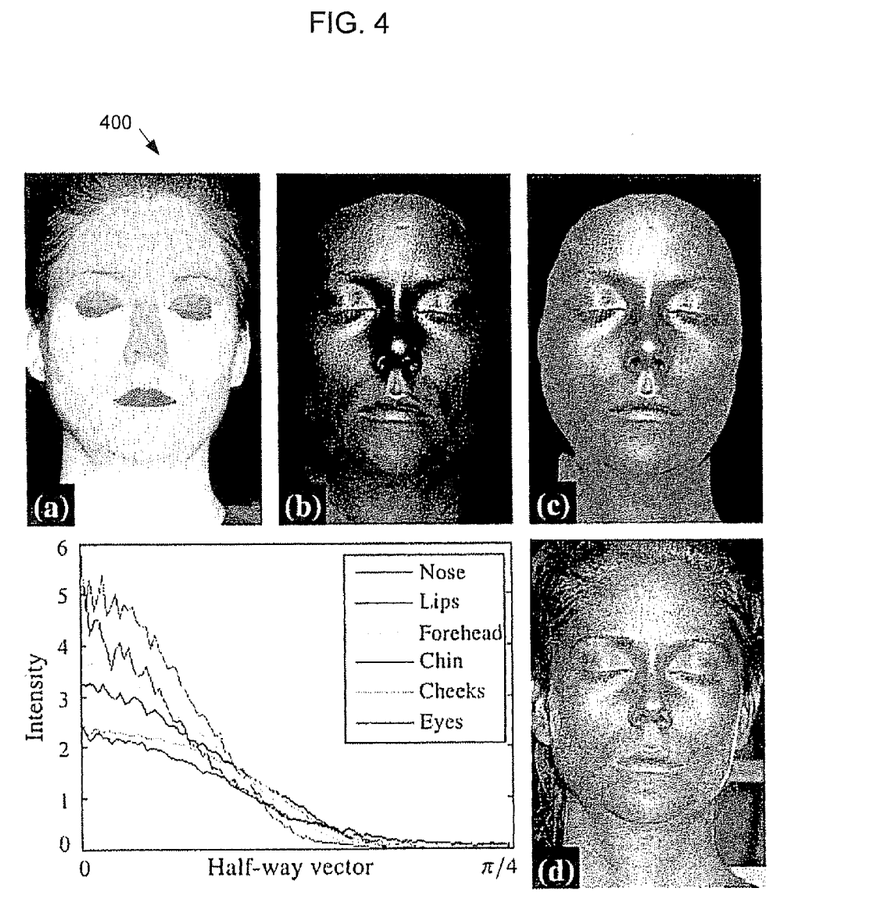
FIG. 4 depicts per region bidirectional reflectance distribution functions ("BRDFs"), in accordance with exemplary embodiments of the present disclosure; the graph shown in FIG. 4 depicts extracted specular distributions per region.

FIG. 4 depicts a collection of images illustrating BRDF techniques in accordance with exemplary embodiments for estimating per-region specular BRDFs: (a) Face segmentation into regions; (b) A front-lit rendering of the spatially-varying specular reflectance; (c) A front-lit rendering with both the spatially-varying specular reflectance and modeled single scattering, and (d) Front-lit polarization difference image with specular reflection and single scattering; the graph shown in FIG. 4 depicts extracted specular distributions per region.

Appropriate reflectance models, and fitting procedures used for specular reflectance and single scattering, as determined according to exemplary embodiments, are described below.

Specular Reflection

The spatially varying specular behavior of skin is important for reproducing facial appearance realistically. In order to minimize the number of measurements, a per-pixel estimation of the specular lobe and albedo is not practical. Therefore, for embodiments of the present disclosure estimates are made of specular albedo per-pixel and ex-tract separate specular roughness distributions for different regions of the face, e.g., those corresponding to the forehead, eyelids, nose, cheekbone, lips, and lower cheek regions (FIG. 4(a)).

The specular roughness distributions over a region can be modeled using a microfacet BRDF model. To keep the number of measurement small, backscattering measurements from a single photograph under point source illumination (i.e., a full-on projector pattern) are utilized to estimate per-region microfacet distributions for the Torrence-Sparrow [1967] model:

$$p(\hat{k}_1, \hat{k}_2) = \frac{c \cdot p(\hat{h}) F(r_0, \hat{k}_2 \cdot \hat{h}) G}{(\hat{k}_1 \cdot \hat{n})(\hat{k}_2 \cdot \hat{n})} \quad (1)$$

where $\hat{k}_1$ is the incident light direction, $\hat{k}_2$ is the viewing direction, c is a normalization constant (corresponding to specular intensity), $p(\hat{h})$ is the normalized distribution, $F(r_0, \hat{k}.\hat{h})$ is the Fresnel reflectance term based on Snell's laws of reflection, and G is the geometric shadowing and masking term based on V-shaped grooves.

According to exemplary embodiments, the Gaussian distribution in the original Torrance-Sparrow model can be replaced with a data-driven distribution term derived directly from the observed backscattering data. This data-driven distribution can be extracted in a manner where the effects of the Fresnel term and the geometric term are assumed to be minimal in the backscattering direction, and the distribution-based BRDF model simplifies to a function that is proportional to the distribution $p(\hat{h})$:

$$p(\hat{k}, \hat{k}) = \frac{c \cdot r_0 p(\hat{h})}{2(\hat{k} \cdot \hat{n}) - (\hat{k} \cdot \hat{n})^2} \quad (2)$$

This distribution can then be directly tabulated, without requiring any numerical optimizations, from the observed data using Eq. 2.

The polarization-difference image of the face lit from the front can be used to observe the backscattered specular reflection (in addition to single scattering), e.g., as shown in FIG. 4(d). Spatial resolution across the face can be traded for angular resolution in order to densely sample a distribution $p(\hat{h})$ per region from a single photograph. To eliminate the effects of single scattering, the regions where specular reflection dominates can be isolated by considering only pixels above a certain brightness threshold and the surface normals of which lie within a cone of 45° from the viewing direction for constructing the specular distributions. The argument for a 45° threshold is that the specular lobes that have been have observed for faces are much sharper than 45°, and single scattering is predominately directed forward in skin. The observed single scattering is therefore dominated by the specular reflection, and hence can be directly used to estimate the specular lobes.

The specular intensity c is unknown at this point, and is required to extract the specular distributions. The estimation process can therefore be "bootstrapped" by (initially) assuming a per-region constant specular intensity. Next, the observed reflectance values can be tabulated against the halfway vectors corresponding to the normal direction. The graph in FIG. 4 plots distributions obtained for different facial regions. As expected, the measured specular lobe shape differs for the different regions.

Finally, a per-pixel specular intensity, c, can be inferred. The polarization-difference image under constant spherical illumination, e.g., as shown in FIG. 3(a), is dominated by the specular reflection for all pixels, unlike front-lit illuminated pixels where single scattering can dominate for pixels facing away from the view (and light) direction. This polarization-difference image under spherical illumination is taken to encode the specular intensity at each pixel modulated by view-dependent Fresnel reflectance.

It can be noted that this illumination condition is also one of the gradient patterns used for computing the surface normals, and thus no additional photograph needs to be recorded. From this, the specular intensity can be estimated using the previously extracted distributions, and factor out Fresnel reflectance effects, assuming a constant index of refraction of 1.38 for skin. Formally, let the observed intensity in the polarization-difference image under constant hemispherical illumination for a given pixel be c, for a fixed viewing direction $\hat{k}_2$ 2, then the following holds: $c' = \int p(\hat{k}_1, \hat{k}_2)(\hat{k}_1.\hat{n})d\omega$. By dividing c' by the (numerically) hemispherically integrated BRDF (assuming c=1.0, and including Fresnel reflectance) the best-fit specular intensity c is obtained. To further refine the estimation of the specular distribution $p(\hat{h})$ and specular intensity c, one could iteratively alternate between estimating $p(\hat{h})$ and c. However, the present inventor have found that a single pass yields accurate results.

A rendering of the obtained specular component under directional illumination from the front can be seen in FIG. 4(b). This rendering closely follows the observed specular reflectance in FIG. 4(d). Note that the differences between both are due to the single scattering included in the polarization-difference photograph.

Single Scattering

The remaining single scattering component can be modeled with the $1^{st}$ order single scattering BRDF model, e.g., the one of Hanrahan and Krueger [1993]:

$$Psinglescatter(\hat{k_1'}, \hat{k}_{2'}) = a \cdot T_{dt} \cdot p(\cos\theta) \frac{1}{\hat{n} \cdot \hat{k}_1' + \hat{n} \cdot \hat{k}_2'}, \quad (3)$$

where a is the scattering albedo, $T_{dt}$ is the transmittance term, and p is the Henyey-Greenstein scattering phase function given as $$p(\cos\theta) = \frac{1 - g^2}{4\pi(1 - g + 2g\cos\theta)^{3/2}},$$

with θ being the angle between incident $\hat{k}_1'^\wedge$ and scattered $k_2$ directions, and g the mean cosine of the scattering angle.

Similar to the specular lobe fits, the Henyey-Greenstein function can be fitted to match the observed backscattering in the polarization-difference image under directional illumination. An assumption can be made that the observed single scattering is mainly due to the top layer of skin, and set the index of refraction of this layer to 1.38, e.g., as described previously. Furthermore, the observed polarization-difference image under uniform spherical illumination minus the specular intensity c can be used as the albedo α for the single scattering fit. Employing the polarization-difference image as a basis for the single scattering albedo can be used in exemplary embodiments and is more data-driven than strictly physically-based, given that any polarization preserving non-specular backscatter can be modeled as single scattering and texture variation may not necessarily be present in the observed single scattering.

Given that the Torrance-Sparrow BRDF models a rough specular surface, the Fresnel equations for transmission in a smooth surface can be replaced with diffuse transmission $T_{dt}$ due to the rough specular surface: $T_{dt} = \rho_{dt}(x,\omega_i)\rho_{dt}(x,\omega_o)$, where:

$$\rho_{dt}(x,\omega_o) = 1.0 - \int \rho_{specular}(x, \hat{k}_1, \hat{k}_2)(\hat{n}_s \cdot \hat{k}_1) d\omega. \quad (4)$$

As with the specular reflectance, the polarization-difference image can be leveraged under constant hemispherical illumination to encodes this per-pixel integral. To facilitate computations, a look-up table for average diffuse transmittance values can be built across the face. This can reduce the task of fitting the observed single scattering to the above BRDF model to a simple search for the best channel-wise g values that minimize the RMS error of the fit to the observed data. Given the slowly varying nature of the data, it has been found that using a single set of channel-wise g values across the entire face is sufficient. A front-lit rendering of the combined single scattering and specular component is shown in FIG. 4(c), which closely matches the reference photograph in FIG. 4(d).

Modeling Multiple Scattering Components

Multiple subsurface scattering of light in skin is an important phenomena that contributes significantly to the skin's soft appearance. Without subsurface scattering, renderings of skin look too harsh. Modeling skin, however, as a single homogeneous scattering media results in a too soft or "waxy" appearance. Modeling skin as a multi-layer subsurface scattering medium can represent the structure of skin much better, and yields more realistic results, e.g., as shown in FIG. 5.

Figure 5:
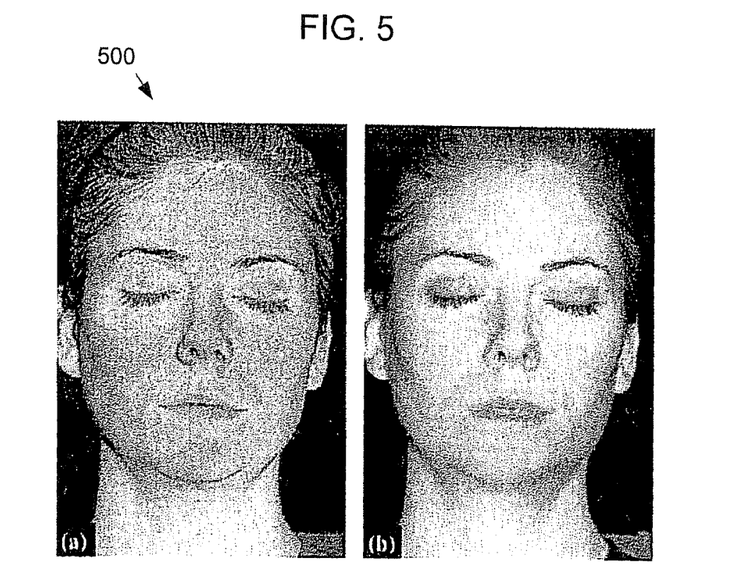
FIG. 5 includes two images depicting separated multiple scattering layers, in accordance with exemplary embodiments of the present disclosure.

FIG. 5 depicts a compilation 500 if separated multiple scattering layers: (a) separated shallow scattering (direct) component; and (b) separated deep scattering (indirect) component. Deep scattering exhibits more saturated coloring and a greater amount of light diffusion than the shallow scattering component.

A possible physically-based model for the appearance of skin is to represent it as a two layer subsurface scattering medium, e.g., as shown in FIG. 2. In such a case, the top layer corresponds to the epidermal layer, which is a scattering layer with a thickness of approximately 0.5 mm, with a color that is mostly determined by the melanin content. In contrast, the bottom layer corresponds to the dermis, which is a (relatively) thick layer with a reddish hue due to blood. Measuring the scattering properties of these two layers exactly, however, can be a difficult problem. Therefore, exemplary embodiments use an approximate data-driven two-layer model, where the interface between both layers corresponds only approximately to the interface between the different skin layers. For such, the two scattering layers may be referred to as shallow and deep to emphasize that they are not precisely associated with specific anatomical skin layers.

To measure the per-pixel ratio between both layers, an observation can be made that the shallow layer scatters light much less than the deep layer. Recently, Nayar et al. [2006] presented a method to separate a photograph into direct and indirect components using high frequency illumination patterns. In scattering materials, the frequency of the illumination patterns determines which part of scattered light is classified as direct, and which part as indirect. Selecting the frequency of the patterns to be on the order of the thickness of the epidermis separates the reflectance into an image containing deep scattering only, and an image containing only shallow scattering.

Exemplary embodiments of the present disclosure can utilize four phase-shifted high-frequency patterns of 1.2 mm-wide stripes from a video projector. Computing a per-pixel max and min over the four images can yield the direct/shallow scattering image (max−min), and indirect/deep scattering image (2×min). Furthermore, cross-polarization can be used to eliminate specular reflections and single scattering. Separated components are shown in FIGS. 3 (e) and (f), and FIG. 5. The shallow scattering shows relatively little color saturation relative to the deep scattering, and the deep scattering exhibits less distinct texture detail. This corresponds to the thesis that the direct component approximately corresponds to the shallow scattering of light in the epidermis while the indirect component approximately corresponds to light which has scattered more deeply within the dermis.

The proposed two layer subsurface scattering model sums the contributions of the shallow and deep scattering layers, due to the way the deep and shallow scattering layers are separated. In this respect, the two-layer model is more data-driven in nature than physically-based.

Figure 6:
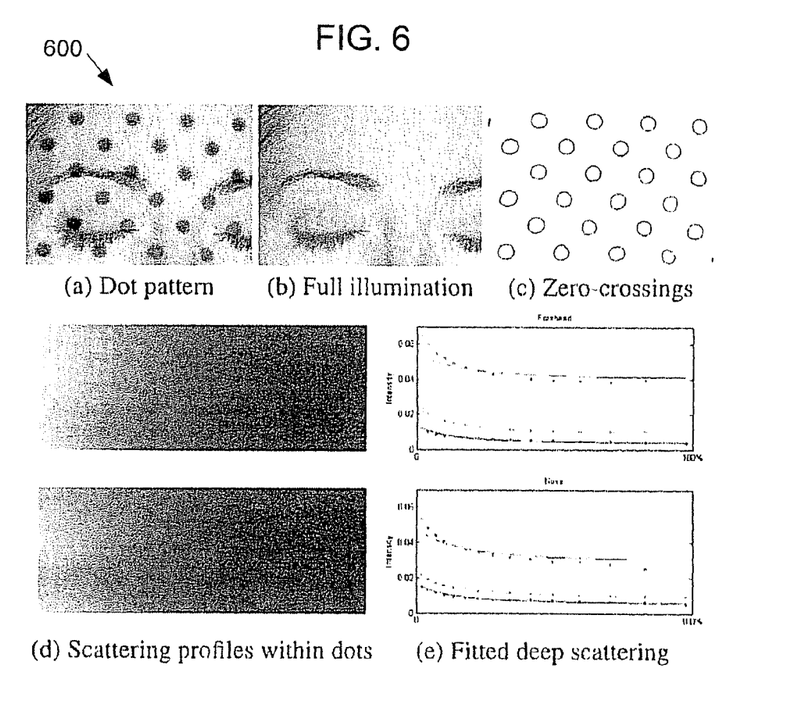
FIG. 6 depicts measurements of per-region scattering parameters, in accordance with exemplary embodiments of the present disclosure.

FIG. 6 depicts a collection 600 of images illustrating techniques for measurement of per-region scattering parameters in accordance with exemplary embodiments: (a) a dot pattern used to observe the scattering profiles depicted in (d); (b) a subject under full illumination; (c) zero-crossings computed from subtracting (a) from (b); and, (e) a fitted deep scattering model versus the observed scattering profile for two different regions. Note that the poor fit close to the peak is because the observed scattering profile also contain shallow scattering effects. However, further from the peak, where deep scattering dominates, a good fit is obtained.

Formally, the multiple subsurface scattering of light in skin can be represented as:

$$L_{multiple}(x_0, \omega_0) = \int_A \int_\Omega T_{dt} R_d(\|x_0 - x_i\|)\cos\theta_i d\omega dA(x_i), \quad (5)$$

where $\omega_i$ is the direction of incident illumination at point $x_i$, and $\omega_o$, is the observed direction of emitted radiance at point $x_o$. $Rd(\|xo-xi\|)$ describes the diffusion of light entering at a point $x_i$ and exiting at point $x_o$, and $T_{dt}$ is given according to Equation 4. A separation technique can then further yield:

$$R_d(\|x_o-x_i\|)=R_{deep}(\|x_o-x_i\|)+R_{shallow}(\|x_o-x_i\|). \quad (6)$$

The dipole diffusion model can be employed to approximate the deep scattering component $R_{deep}(\|xo-xi\|)$ from measured scattering profiles, assuming an infinitely deep dermis. Subsequently, the effects of deep scattering can be removed from the measured scattering profiles using the dipole fit, and scattering parameters can be estimated for the shallow scattering $R_{shallow}(\|xo-xi\|)$ using the multipole model. Further details of the modeling of both layers are described, infra.

Deep Scattering

The deep scattering component can be modeled using the dipole diffusion model [Jensen et al. 2001]:

$$R_{deep}(\|x_0 - x_i\|) = \frac{\alpha'}{4\pi}\left(z_r\left(\sigma_{tr} + \frac{1}{d_r}\right)\frac{e^{-\sigma_{tr}d_r}}{d_r^2} + z_v\left(\sigma_{tr} + \frac{1}{d_v}\right)\frac{e^{-\sigma_{tr}d_v}}{d_v^2}\right), \quad (7)$$

where $z_r$ ($d_r$) is the distance of the real source to the surface ($x_o$), and $z_v$ ($d_v$) is the distance of the virtual source to the surface ($x_o$). This requires estimating two model parameters: the reduced albedo $\alpha'$ for $x_o$, and translucency (diffuse mean free path) $l_d=1/\sigma_{tr}$. For optically dense materials, the following relation holds for $\alpha'$:

$$R_{deep} = \frac{\alpha'}{2}\left(1 + e^{\frac{-4}{3}A\sqrt{3(1-\alpha')}}\right)e^{-\sqrt{3(1-\alpha')}}, \quad (8)$$

where $R_{deep}$ is the diffuse albedo, and A is the internal reflection parameter that can be computed as $$\frac{1+\rho_d}{1-\rho_d}$$

with $\rho_d$ the reflectance of a rough specular surface due to hemispherical illumination. The per-pixel $R_{deep}$ values obtained from the separated indirect component, e.g., as depicted in FIG. 5(b), can be employed after factoring in the cosine falloff, to compute per-pixel α' values.

An estimate can be made of a per-region, e.g., as shown in FIG. 4(a), translucency value $I_d$ across the face from the scattering profiles observed by projecting a (polarized) solid white pattern with black dots on the face, as in FIG. 6(a). The projected dots for an exemplary embodiment are 6 mm in diameter and with 1 cm spacing between them, which exceeds the typical scattering distance of light through skin. A lookup table of effective diffusion profiles due to such an illumination pattern can be pre-computed in order to obtain estimates for $l_d$ in various regions of the face. It is preferred to use spatially-varying diffusion parameters instead of a using a modulation texture in the model as it results in a finer-scale control of the subsurface scattering. While this does not achieve the same accuracy to model a heterogeneous medium (e.g., skin) as with fully data-driven methods, the spatially varying parameters provide a flexible, yet compact, approximation for modeling the observed variation in different regions of the face.

The observed scattering profiles are the combined result of deep and shallow scattering. However, the extent of shallow scattering is much less than that of deep scattering. Therefore, by only considering the inner two-thirds of the projected black dots, the effects of shallow scattering are minimized, and a dipole fit can be computed.

Accurately localizing the dot boundaries is important for model fitting and is complicated by the blurring of the dot edges by the scattering. To localize the dot boundaries, the dot image can be subtracted from the fully-lit projector image FIG. 6(b), obtaining an image of illuminated blurry dots on a dark background. The zero-crossings of the difference between these negative and positive dot images reliably indicate sharp estimates of the dot boundaries as in FIG. 6(c). To use all of the information within each dot, a radial average of the diffusion profile can be performed from the center going outwards to the dot periphery and use data up to two-thirds of the way (e.g., a 30 pixel radius) for the fitting process. Results of this fitting process are depicted in FIG. 6(e). As can be seen, the fitted dipole matches the observations closely in the last two-thirds (the fitted region), while exhibiting a larger error on the first third of the scattering profiles (extrapolated region). Finally, the translucency from the dots in each region can be estimated and the estimates can be blurred across region boundaries.

Shallow Scattering

Most of the first third of the scattering pro-files observed under the black dot pattern is the result of both shallow and deep scattering. The deep scattering is estimated from the inner two-thirds, which can be presumed to be negligibly influenced by the shallow scattering. FIG. 6(e) illustrates this effect clearly. Using the estimated deep scattering dipole model, the effects of deep scattering can be removed from the observed scattering profiles, and fit an appropriate scattering model to the residual. Shallow scattering in the top epidermal layer of skin can be modeled with the multiple diffusion model [Donner and Jensen 2005]:

$$R_{shallow}(\|x_o - x_i\|) = \frac{\alpha'}{4\pi}\sum_{i=-n}^{n}\left(\frac{z_{r,i}(1+\sigma_{tr}d_{r,i})e^{-\sigma_{tr}d_{r,i}}}{d_{r,i}^3} - \frac{z_{v,i}(1+\sigma_{tr}d_{v,i})e^{-\sigma_{tr}d_{v,i}}}{d_{v,i}^3}\right).$$

A similar fitting process can be applied to the deep scattering fit where an additional lookup table is employed for the residual profile using the shallow scattering albedo observed from the separated direct component, e.g., as shown in FIG. 5(a). For an exemplary embodiment, the multipole model with five dipoles can be used with an assumption of a layer depth of 0.5 mm, which is roughly half the width of the projected separation patterns, for obtaining such a fit. An index of refraction of 1.38 can be assumed for the top layer of skin. To further simplify the multipole fitting, an assumption can be made that there is no change in the index of refraction between the shallow and deep scattering layers.

Results

Exemplary Embodiments

In this section, results are presented as rendered with an exemplary embodiment of a layered facial reflectance model and the corresponding fits obtained from the acquired data. To visualize the results, the popular PBRT ray tracer [Pharr and Humphreys 2004] was modified to support a facial reflectance model. To render subsurface scattering, photon mapping can be employed, and added to the dipole and multipole diffusion models, e.g., as a shader in PBRT, for exemplary embodiments. The photon deposition phase can be modified to include the cosine of the incident photons and modulate by the transmittance at incidence. During the rendering phase, one-bounce gathering can be switched off and the spatially-varying dipole and multipole kernels can be used respectively for density estimation with further modulation by the transmittance at existence. Accordingly, facial reflectance models according to the present disclosure should be easily incorporated in production rendering pipelines.

Figure 7:
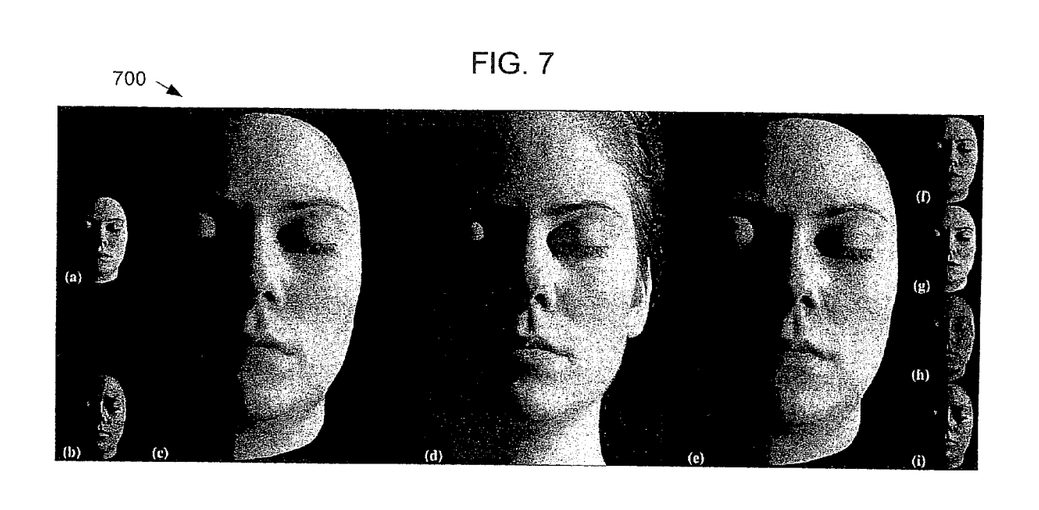
FIG. 7 shows a comparison of renderings with measured data, in accordance with exemplary embodiments of the present disclosure.

FIG. 7 depicts a collection 700 of images illustrating the benefit of an exemplary layered model for acquired reflectance data with offline renderings of a female subject. In FIG. 7, a qualitative comparison can be made of the layered rendering with a traditional rendering with acquired data including spatially-varying specular reflectance+single layer subsurface scattering. For the single layer rendering, dipole diffusion parameters can be extracted from the projected dot patterns similar to the fitting process for the deep scattering layer. Despite both methods using measured data from the same setup, the rendering with the layered reflectance model with additional single scattering and shallow and deep multiple scattering (e) looks much more skin-like compared to rendering with the traditional model for measured data (c), and is a closer match to the validation photograph (b).

The deep multiple scattering is fit from observations that modulate incident irradiance by the absorption and transmittance of the shallow scattering layer. Hence, first order effects of interactions (reflectance and transmittance) between the shallow and deep scattering layers are automatically included in the estimated parameters of deep multiple scattering. While the employed dipole model may not fit the resultant scattering profiles perfectly, it better models the combined properties of the shallow and deep scattering layers, and reproduces the subtleties of skin appearance better than a single layer model. The individual layers are shown in (a-b), and (f-i).

FIG. 7(c) depicts the result of combining the single layer subsurface scattering component (a) and the specular layer (b) (+2 f-stops). FIG. 7(e) is the result of combining the four layers in the model: deep multiple scattering (f), shallow multiple scattering (g) (+2 f-stops), single scattering (h) (+5 f-stops), and the specular reflectance (i) (+2 f-stops). It can be noted how the deep multiple scattering (f) contains less texture detail than the single layer approximation (a), which in turn contains less detail than the shallow multiple scattering layer (g).

Table 1 lists some of the dipole diffusion parameter fits obtained from measurements made for an exemplary embodiment for the female subject and corresponding values reported in the literature as a means of quantitative validation of techniques of the present disclosure. As can be seen, the estimated diffusion parameters are closer to those reported by Weyrich et al. [2006] for faces than those reported by Jensen et al. [2001] who measured the scattering on a skin patch on the forearm which is most likely more translucent than facial skin.

In order to compare the extracted specular distributions for the Torrance-Sparrow model to those reported in the literature, the raw data was fit to a Gaussian distribution with roughness parameter m. The obtained region-wise fits of m for the female subject (nose=0.2, eyes=0.25, fore-head=0.3, cheeks=0.325) are very similar to those reported by Weyrich et al. [2006]. An estimate was also made for the per-channel single scattering Henyey-Greenstein phase function parameter g to be between 0.63-0.7 compared to 0.75 reported in [Hanrahan and Krueger 1993]. The slightly lower values for g can be potentially attributed to the approximation of some amount of polarization pre-serving multiple scattering as single scattering in the model utilized for the exemplary embodiment.

Figure 8:
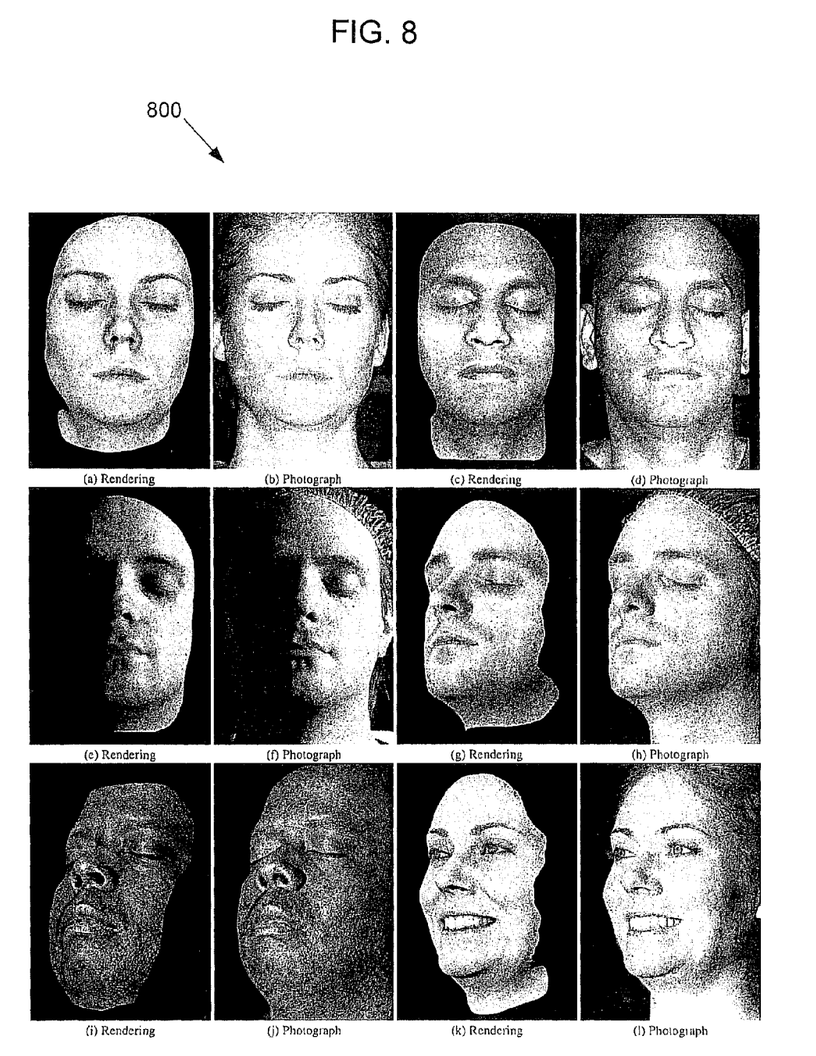
FIG. 8 depicts rendering results and validation photographs of multiple test subjects, in accordance with an exemplary embodiment of the present disclosure.

FIG. 8 depicts a collection 800 of rendering results and validation photographs: (a,c) show offline renderings of two subjects under frontal point-source illumination, showing our technique's ability to replicate the appearance shown in the reference photographs in (b,d); (e,g) depicts offline renderings of a male subject in novel lighting and viewpoint conditions and corresponding validation photographs (f,h); (i) depicts real-time rendering using hybrid normal maps of a male subject with dark skin rendered from a novel viewpoint and validation photograph (0); and (k) depicts an offline rendering of a female subject in a dynamic pose wearing makeup and a validation photograph (1).

As shown In FIG. 8, by the rendering results from five acquired face models, the top row of FIG. 8 illustrates the ability of the multi-layer reflectance model of an exemplary embodiment to reproduce the original front-lit illumination condition used for reflectance modeling for two subjects. A greenish tint near the top of the original (color) photographs was believed to result from uneven color in the cross-polarized video projector used as the illuminant. The corresponding renderings do not exhibit this effect since their albedo texture is derived from the spherical LED illumination.

With continued reference to FIG. 8, the middle row shows two side-by-side renderings of a male subject with light skin. The left pair shows the subject from the original left camera viewpoint but under novel illumination from an additional point light source. The right camera shows the subject from a novel viewpoint, illuminated from the frontal video projector. Both renderings substantially reproduce the subject's appearance.

In exemplary embodiments, a real-time rendering approach with acquired reflectance data that leverages hybrid normal maps [Ma et al. 2007 (cited previously)] together with a local shading model that includes the inferred specular reflectance and single scattering, and which approximates subsurface scattering by a diffuse BRDF model. Results of this real-time rendering can be seen in the final row of FIG. 8(i), where a male subject with dark skin is rendered with from novel viewpoint together with a validation photograph.

Finally, the female subject is rendered in a smiling pose with makeup from novel viewpoint in FIG. 8(k) together with a validation photograph. The female subject could be captured in a smiling pose due to the short five-second capture process. It would be difficult to keep a steady expression for longer acquisition times. The data-driven facial reflectance model is also flexible enough to model such altered skin reflectance.

In general, the renderings of FIG. 8 bear a close resemblance to the original photographs, successfully reproducing the appearance of a wide variety of skin tones and textures. However, due to the simplicity of the model described (in the context of exemplary embodiments), not all effects are modeled with equal accuracy. Subtle differences can arise due to differences in the specular roughness and diffuse reflectance within facial regions. While the simplicity of the multi-layer reflectance model (of the described embodiment) can introduce some limitations, it is also makes it a practical method that can be easily implemented in existing rendering systems. Additionally, because the model can be inferred from a few photographs and requires no physical contact device to measure scattering properties, it is more robust to changes due to subject motion or blood flow, and is able to capture the facial appearance of people in natural facial expressions that are hard to maintain for more than a few seconds.

Accordingly, aspects and embodiments of the present disclosure can provide practical techniques, including systems and methods, for measuring and modeling the appearance of a face from relatively few pictures, e.g., just twenty photographs captured from a single viewpoint under environmental and projected illumination. Principal benefits afforded by such embodiments can include: (i) estimating specular reflectance and explicit modeling of single scattering of a subject from a few lighting conditions; (ii) a practical estimation for scattering parameters for a data-driven multi-layer diffusion model of a subject from a small set of photographs; and (iii) capturing detailed facial reflectance at high resolution in a small number of (e.g., just 20) photographs, recorded in a few seconds. Additionally, techniques of the present disclosure, due to short acquisition times, can enable new possibilities for analyzing time-varying effects of facial reflectance. For example the changes in skin reflectance due to blood flow or sweat can be monitored, or the effects of facial animation on the appearance of skin can be examined.

The techniques of the present disclosure are believed to be the first practical ones that measures single scattering and spatially-varying multi-layer scattering parameters from a live subject. The techniques of exemplary embodiments were validated by comparing renderings of subjects to reference photographs recorded from novel viewpoints and under novel illumination conditions. For exemplary embodiments, the obtained parameters were shown to be quantitatively similar to those reported in the literature, and the resulting renderings were shown as being qualitatively a close match to reference photographs.

While certain embodiments have been described herein, it will be understood by one skilled in the art that the methods, systems, and apparatus of the present disclosure may be embodied in other specific forms without departing from the spirit thereof. For example, while aspects and embodiments herein have been described in the context of certain mathematical formula, others may be used or substituted. Accordingly, the embodiments described herein, and as claimed in the attached claims, are to be considered in all respects as illustrative of the present disclosure and not restrictive.

What is claimed is:

1. A system for capturing spatially-varying layered facial reflectance parameters from a small number of photographs of a subject taken under different illumination conditions, the system comprising:
    a plurality of light sources having light output intensities that are controllable so as to generate one or more illumination patterns that illuminate a face;
    one or more polarized cameras configured to receive light that is reflected from the illuminated face and to generate from the reflected light photographic data of the face; and
    a processing system configured to receive the data from the one or more cameras and to calculate facial reflectance based on a layered facial reflectance model that separately models specular reflection and single scattering and/or that separately models shallow subsurface scattering and deep subsurface scattering.

2. The system of claim 1, further comprising plurality of linear polarizing filters configured and arranged to polarize light from the light sources.

3. The system of claim 1, further comprising an LCD video projector configured and arranged to illuminate the face with a light projection.

4. The system of claim 1, further comprising a light projector that is linearly polarized configured and arranged to illuminate the face with a light projection.

5. The system of claim 1, wherein the reflectance data includes specular reflectance data and diffuse reflectance data and the processing system is further configured and arranged to calculate a specular normal map from the specular reflectance data and a diffuse normal map from the diffuse reflectance data.

6. The system of claim 1, wherein the layered facial reflectance model separately models specular reflectance, single scattering, shallow subsurface scattering, and deep subsurface scattering.

7. A method for estimating scattering parameters for a spatially varying multi-layer reflectance model of a subject from a set of photographs taken under lighting conditions, the method comprising:
    illuminating the subject with one or more illumination patterns from light sources;
    filtering light reflected from the subject with one or more filters wherein specularly reflected light is separated from diffusely reflected light;
    generating specular reflectance data representative of the specularly reflected light and diffuse reflectance data representative of the diffusely reflected light;
    calculating reflectance components for the image of the subject based on a layered reflectance model using a processing system, the reflectance components separately modeling specular reflection and single scattering and/or separately modeling shallow subsurface scattering and deep subsurface scattering; and
    rendering an image of the reflectance of the subject based on the reflectance model.

8. The method of claim 7, further comprising estimating a specular normal map from the specular reflectance data, and separately estimating a diffuse normal map from the diffuse reflectance data.

9. The method of claim 7, wherein the layered facial reflectance model includes components for specular reflectance, singe scattering, shallow subsurface scattering, and deep subsurface scattering.

10. The method of claim 9, further comprising estimating specular albedo on a per-pixel basis and estimating separate specular roughness distributions for different regions of the face.

11. The method of claim 10, wherein the different regions comprise the forehead, eyelids, nose, cheekbones, lips, and lower cheek regions.

12. The method of claim 10, wherein estimating specular roughness distributions over the different regions is in accordance with $$p(\hat{k}, \hat{k}) = \frac{c \cdot r_o p(\hat{h})}{2(\hat{k} \cdot \hat{n}) - (\hat{k} \cdot \hat{n})^2},$$

wherein $\hat{k}_1$ is the incident light direction, $\hat{k}_2$ is the viewing direction, c is a normalization constant corresponding to specular intensity, and $p(\hat{h})$ is the normalized distribution.

13. The method of claim 9, wherein the single scattering component is calculated in accordance with:

$$P\,singlescatter(\hat{k}'_{r1}, \hat{k}_{2'}) = a.T_{dt}.p(\cos\theta)\frac{1}{\hat{n}\cdot\hat{k}'_1 + \hat{n}\cdot\hat{k}'_2},$$

where a is the scattering albedo, $T_{dt}$ is the transmittance term, and p is the scattering phase function given as $$p(\cos\theta) = \frac{1-g^2}{4\pi(1-g+2g\cos\theta)^{3/2}},$$

with θ being the angle between incident $\hat{k}_1'$ and scattered $\hat{k}_2'$ directions, and g the mean cosine of the scattering angle.

14. The method of claim 9, wherein the deep scattering component is calculated in accordance with:

$$R_{deep}(\|x_o - x_i\|) = \frac{\alpha'}{4\pi}\left(z_r\left(\sigma_{tr} + \frac{1}{d_r}\right)\frac{e^{-\sigma_{tr}d_r}}{d_r^2} + z_v\left(\sigma_{tr} + \frac{1}{d_v}\right)\frac{e^{-\sigma_{tr}d_v}}{d_v^2}\right),$$

where $z_r$ ($d_r$) is the distance of the real source to the surface ($x_o$), and $z_v$ ($d_v$) is the distance of the virtual source to the surface ($x_o$).

15. The method of claim 14, further comprising estimating the reduced albedo α' for $x_0$ and translucency $I_d = 1/\sigma_{tr}$.

16. The method of claim 15, wherein the reduced albedo a' is calculated in accordance with:

$$R_{deep} = \frac{\alpha'}{2}(1 + e^{\frac{-4}{3}A\sqrt{3(1-\alpha')}})e^{-\sqrt{3(1-\alpha')}}, \qquad (8)$$

where $R_{deep}$ is the diffuse albedo, and A is the internal reflection parameter computed as the reflectance of a rough specular surface due to hemispherical illumination.

17. The method of claim 16, wherein A is computed as $$\frac{1+\rho_d}{1-\rho_d}$$

with $\rho_d$ the reflectance of a rough specular surface due to hemispherical illumination.

18. The method of claim 14, wherein the shallow scattering component is calculated as:

$$R_{shallow}(\|x_o - x_i\|) = \frac{\alpha'}{4\pi}\sum_{i=-n}^{n}\left(\frac{z_{r,i}(1+\sigma_{tr}d_{r,i})e^{-\sigma_{tr}d_{r,i}}}{d_{r,i}^3} - \frac{z_{v,i}(1+\sigma_{tr}d_{v,i})e^{-\sigma_{tr}d_{v,i}}}{d_{v,i}^3}\right).$$

19. The method of claim 7, further comprising calculating a polarization difference image under constant hemispherical illumination.

20. The method of claim 7, wherein calculating reflectance components comprises estimating spatially varying specular reflectance properties of the subject from observations of the subject under controlled lighting conditions in conjunction with a measured surface normal map.

21. The method of claim 7, wherein calculating reflectance components comprises estimating a reflectance model for the single scattering component of a subject based on polarization-preserving reflectance measurements which discount the effect of specular reflection.

22. The method of claim 7, wherein calculating reflectance components comprises estimating the subsurface scattering parameters of a subject using one image showing the subject illuminated by a projected pattern having sharp edges between its illuminated and non-illuminated areas.

23. The method of claim 7, further comprising estimating independently reflectance components due to shallow and deep scattering within the subject.

24. A computer-executable program product for estimating scattering parameters for a spatially varying multi-layer skin scattering model of a subject from a set of photographs taken under lighting conditions and rendering a facial reflectance image, the program product comprising a non-transitory computer-readable medium with resident computer-readable instructions, the computer readable instructions comprising instructions for:

generating reflectance data based on light reflected from a face of the subject; and calculating facial reflectance of the subject based on a layered facial reflectance model that separately models specular reflection and single scattering and/or that separately models shallow subsurface scattering and deep subsurface scattering.

25. The computer-executable program product of claim 24, further comprising generating specular reflectance data representative of specularly reflected light and diffuse reflectance data representative of diffusely reflected light and estimating a specular normal map from the specular reflectance data, and separately estimating a diffuse normal map from the diffuse reflectance data.

26. The computer-executable program product of claim 24, wherein the layered facial reflectance model includes components for specular reflectance, single scattering, shallow subsurface scattering, and deep subsurface scattering.

27. The computer-executable program product of claim 26, further comprising estimating specular albedo on a per-pixel basis and estimating separate specular roughness distributions for different regions of the face.

28. The computer-executable program product of claim 27, wherein the different regions comprise the forehead, eyelids, nose, cheekbones, lips, and lower cheek regions.

29. The computer-executable program product of claim 27, wherein estimating specular roughness distributions over the different regions is in accordance with:

$$p(\hat{k},\hat{k}) = \frac{c \cdot r_o p(\hat{h})}{2(\hat{k}\cdot\hat{n}) - (\hat{k}\cdot\hat{n})^2},$$

wherein $\hat{k}_1$ is the incident light direction, $\hat{k}_2$ is the viewing direction, c is a normalization constant corresponding to specular intensity, and $p(\hat{h})$ is the normalized distribution.

30. The computer-executable program product of claim 26, wherein the single scattering component is calculated in accordance with:

$$P\,singlescatter(\hat{k}'_{1}, \hat{k}_{2'}) = a \cdot T_{dt} \cdot p(\cos\theta)\frac{1}{\hat{n}\cdot\hat{k}'_1 + \hat{n}\cdot\hat{k}'_2},$$

where a is the scattering albedo, $T_{dt}$ is the transmittance term, and p is the scattering phase function given as $$p(\cos\theta) = \frac{1-g^2}{4\pi(1-g+2g\cos\theta)^{3/2}},$$

with θ being the angle between incident $\hat{k}_1'$ and scattered $\hat{k}_2'$ directions, and g the mean cosine of the scattering angle.

31. The computer-executable program product of claim 26, wherein the deep scattering component is calculated in accordance with:

$$R_{deep}(\|x_o - x_i\|) = \frac{\alpha'}{4\pi}\left(z_r\left(\sigma_{tr} + \frac{1}{d_r}\right)\frac{e^{-\sigma_{tr}d_r}}{d_r^2} + z_v\left(\sigma_{tr} + \frac{1}{d_v}\right)\frac{e^{-\sigma_{tr}d_v}}{d_v^2}\right),$$

where $z_r(d_r)$ is the distance of the real source to the surface ($x_o$), and $z_v(d_v)$ is the distance of the virtual source to the surface ($x_o$).

32. The computer-executable program product of claim 31, further comprising estimating the reduced albedo α' for $x_0$ and translucency $I_d = 1/\sigma_{tr}$.

33. The method of claim 32, wherein the reduced albedo α' is calculated in accordance with:

$$R_{deep} = \frac{\alpha'}{2}(1 + e^{\frac{-4}{3}A\sqrt{3(1-\alpha')}})e^{-\sqrt{3(1-\alpha')}}, \qquad (8)$$

where $R_{deep}$ is the diffuse albedo, and A is the internal reflection parameter computed as the reflectance of a rough specular surface due to hemispherical illumination.

34. The computer-executable program product of claim 33, wherein A is computed as $$\frac{1+\rho_d}{1-\rho_d}$$

with $\rho_d$ the reflectance of a rough specular surface due to hemispherical illumination.

35. The computer-executable program product of claim 31, wherein the shallow scattering component is calculated as:

$$R_{shallow}(\|x_o - x_i\|) = \frac{\alpha'}{4\pi} \sum_{i=-n}^{n} \left( \frac{z_{r,i}(1 + \sigma_{tr}d_{r,i})e^{-\sigma_{tr}d_{r,i}}}{d_{r,i}^3} - \frac{z_{v,i}(1 + \sigma_{tr}d_{v,i})e^{-\sigma_{tr}d_{v,i}}}{d_{v,i}^3} \right).$$

36. The computer-executable program product of claim 24, further comprising calculating a polarization difference image under constant hemispherical illumination.

* * * * *